United States Patent
Leser

(10) Patent No.: US 8,215,654 B1
(45) Date of Patent: Jul. 10, 2012

(54) LINEAR TO ROTARY DRIVE SYSTEM FOR BICYCLES AND SIMILAR VEHICLES

(76) Inventor: Walter P. Leser, Denver, CO (US)

( * ) Notice: Subject to any disclaimer, the term of this patent is extended or adjusted under 35 U.S.C. 154(b) by 404 days.

(21) Appl. No.: 12/657,013

(22) Filed: Jan. 11, 2010

(51) Int. Cl.
  *B62M 1/04* (2006.01)
  *B62M 1/00* (2010.01)

(52) U.S. Cl. .............. 280/252; 280/241; 74/37

(58) Field of Classification Search .......... 280/252, 280/241; 74/25, 27, 34, 37
See application file for complete search history.

(56) References Cited

U.S. PATENT DOCUMENTS

| | | | | |
|---|---|---|---|---|
| 719,595 | A * | 2/1903 | Huss | 280/252 |
| 1,500,854 | A * | 7/1924 | Starr | 280/241 |
| 3,079,161 | A * | 2/1963 | Rogers | 280/1.191 |
| 4,169,609 | A * | 10/1979 | Zampedro | 280/241 |
| 4,923,193 | A * | 5/1990 | Pitzen et al. | 482/63 |
| 4,928,986 | A * | 5/1990 | Carpenter | 280/234 |
| 5,979,922 | A * | 11/1999 | Becker et al. | 280/252 |
| 6,000,707 | A * | 12/1999 | Miller | 280/288.1 |
| 6,129,646 | A * | 10/2000 | Farmos | 474/152 |
| 2003/0020254 | A1* | 1/2003 | Weaver, II | 280/252 |
| 2003/0173755 | A1* | 9/2003 | Lachenmayer | 280/252 |
| 2005/0051992 | A1* | 3/2005 | Lachenmayer | 280/252 |

\* cited by examiner

*Primary Examiner* — Paul N Dickson
*Assistant Examiner* — Wesley Potter
(74) *Attorney, Agent, or Firm* — Edwin H. Crabtree; Ramon L. Pizarro

(57) ABSTRACT

A drive system for a bicycle includes first and second drive sprockets, with respective one-way clutches. The drive sprockets are mounted on opposite ends of the bike's drive shaft. First and second idler pulleys are mounted on an upper pulley shaft. The upper pulley shaft mounts on the bike's frame above the rotary drive shaft and at a right angle thereto. A chain is mounted on the drive sprockets and the idler pulleys. A first pedal is attached to the chain between the first drive sprocket and the first idler pulley. A second pedal is attached to the chain between the second linear drive sprocket and the first linear driven idler pulley. First and second linear chain guides are mounted on opposite sides of the frame and disposed next to the chain for guiding portions of the chain and the pedals as they are moved up and down on the bicycle.

14 Claims, 4 Drawing Sheets

LINEAR TO ROTARY DRIVE SYSTEM FOR BICYCLES AND SIMILAR VEHICLES

BACKGROUND OF THE INVENTION (a) Field of the Invention

This invention relates to a mechanical drive system for driving a two-wheel, pedal powered vehicle and more particularly, but not by way of limitation, to a linear to rotary transfer drive system, using pedal power, for increasing the torque input on a bicycle or similar chain, cable or belt driven vehicle.

(b) Discussion of Prior Art

Heretofore, a rear wheel of a standard single speed, three speed, ten speed or other speed, two-wheel or three-wheel bicycle must be continuously rotated by a bike rider using a pair of pedals mounted on a rotary drive axle with rotary drive sprocket and horizontal endless chain. The rotary drive axle is mounted on a bicycle frame with a seat, a front wheel used for steering, and the rear wheel connected to the endless chain for driving the bicycle.

The standard rotary drive chain system for the bicycle using a pair of pedals provides for only ½ of the torque, in pound/feet, for rotating the rear wheel when compared to a linear drive chain system, which provides full torque thereon. For example, when moving a first pedal on the right side of a bike frame in the standard rotary drive system from a 12 o'clock position to a 3 o'clock position on the drive axle and drive sprocket, variable torque is applied from zero to maximum. But, the torque dissipates from maximum to zero when moving from the 3 o'clock position to the 6 o'clock position. At the same time, a second pedal on the left side of the bike frame moves from a 6 o'clock position to the 12 o'clock position and provides no torque on the drive axle and drive sprocket unless the second pedal is fitted to exert a lifting force, which would provide torque from zero to maximum a 9:00 o'clock then back to zero at 12:00 o'clock.

The subject linear to rotary drive system provides for full torque on the drive shaft and drive sprocket during any linear movement of the bicycle's two pedals. For example, if the standard rotary drive system on the bicycle delivers 1 pound/foot of torque rotating the bike pedals a full cycle, the subject linear drive system attached to the rotary drive system delivers 2 pound/foot or twice the amount of torque, when moving the bike pedals a full cycle up and down.

In U.S. Pat. No. 556,802 to Boyle, a different linear to rotary chain driven bicycle is disclosed. The Boyle bicycle includes one modified, rotary drive chain attached to the drive sprocket activated by the down motion of one of the bike's pedals. Also, the bike system includes a second chain which activates the drive sprocket via a down force of a second bike pedal. The pedals include pawls for lowering the chains from an up position to a down position. Further, the bike system includes a third transverse chain for raising the pedal opposite to the pedal being lowered. This prior art patent doesn't disclose a near vertical, endless linear drive sprocket chain mounted on a pair of linear drive sprockets independent of the bike's rotary drive sprocket and the endless rotary drive chain. Also, this patent doesn't disclose pedals that can provide increased torque on the rotary drive axle and the rotary drive sprocket during both the up and down linear movement of the two pedals.

SUMMARY OF THE INVENTION

In view of the foregoing, it is a primary objective of the subject invention to provide a linear to rotary transfer drive system, using pedal power, that increases the torque on a standard rotary drive shaft and rotary drive sprocket of a bicycle without additional energy expended by a bike rider.

Another object of the invention is that the linear to rotary drive system can be used equally well on other types of pedal powered chain, cable or belt driven equipment.

Still another key object of the linear drive system is the increased torque on the rotary drive shaft and rotary drive sprocket can be applied during both a down pedal stroke and an up pedal stroke. In a primary embodiment of the invention, the linear drive system uses a pair of pedals. In an alternate embodiment, the invention can be operated using a single pedal.

Yet another key object of the invention is the linear to rotary transfer drive system can be retrofitted on a standard bicycle and attached to the bike's existing rotary drive system for driving the rotary drive sprocket and horizontal rotary drive chain.

The subject invention is a linear to rotary transfer drive system for increased torque on a standard bicycle or other like systems. The bicycle, using a standard rotary drive system, includes a front wheel and rear wheel mounted on a bike frame with seat. The frame includes a rotary drive shaft perpendicular to the length of the frame. A rotary drive sprocket is attached to the rotary drive shaft. A horizontal, rotary, endless chain is received on the rotary drive sprocket and on a rear wheel driven sprocket mounted on the rear wheel.

The linear drive system, for mounting on the bicycle and incorporated into the rotary drive system, includes a first linear drive sprocket, with a one-way clutch, and a second linear drive sprocket, with a one-way clutch, adapted for mounting on opposite ends of the rotary drive shaft.

A first linear driven idler pulley and a second linear driven idler pulley are mounted on an upper pulley shaft. The upper pulley shaft is adapted for mounting on the bike frame and is disposed above the rotary drive shaft and at right angles thereto.

A near vertical, endless linear drive chain is mounted on the first and second linear drive sprockets and the first and second linear driven idler pulleys.

A first right angle adjustable chain coupler and a first right angle fixed chain coupler are attached to the linear drive chain and disposed above the first linear drive sprocket. A second right angle adjustable chain coupler and a second right angle fixed chain coupler are attached to the linear drive chain and disposed above the first linear drive sprocket.

A first pedal, with a shoe lifting device or shoe strap, is attached to the linear drive chain and disposed between the first linear drive sprocket and the first linear driven idler pulley. A second pedal with shoe strap is attached to the linear drive chain and disposed between the second linear drive sprocket and the first linear driven idler pulley.

A first linear chain guide is mounted on one side of the frame and disposed next to the linear drive chain for guiding a portion of the chain and the first pedal as it is moved linearly up and down on the bicycle. A second linear chain guide is mounted on the opposite side of the frame and disposed next to the linear drive chain for guiding a portion of the chain and the second pedal as it is moved linearly up and down on the bicycle.

These and other objects of the present invention will become apparent to those familiar with linear and rotary drive chain systems for vehicles when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the invention, and in which.

DETAILED DESCRIPTION OF THE PREFERRED EMBODIMENTS

Figure 1:
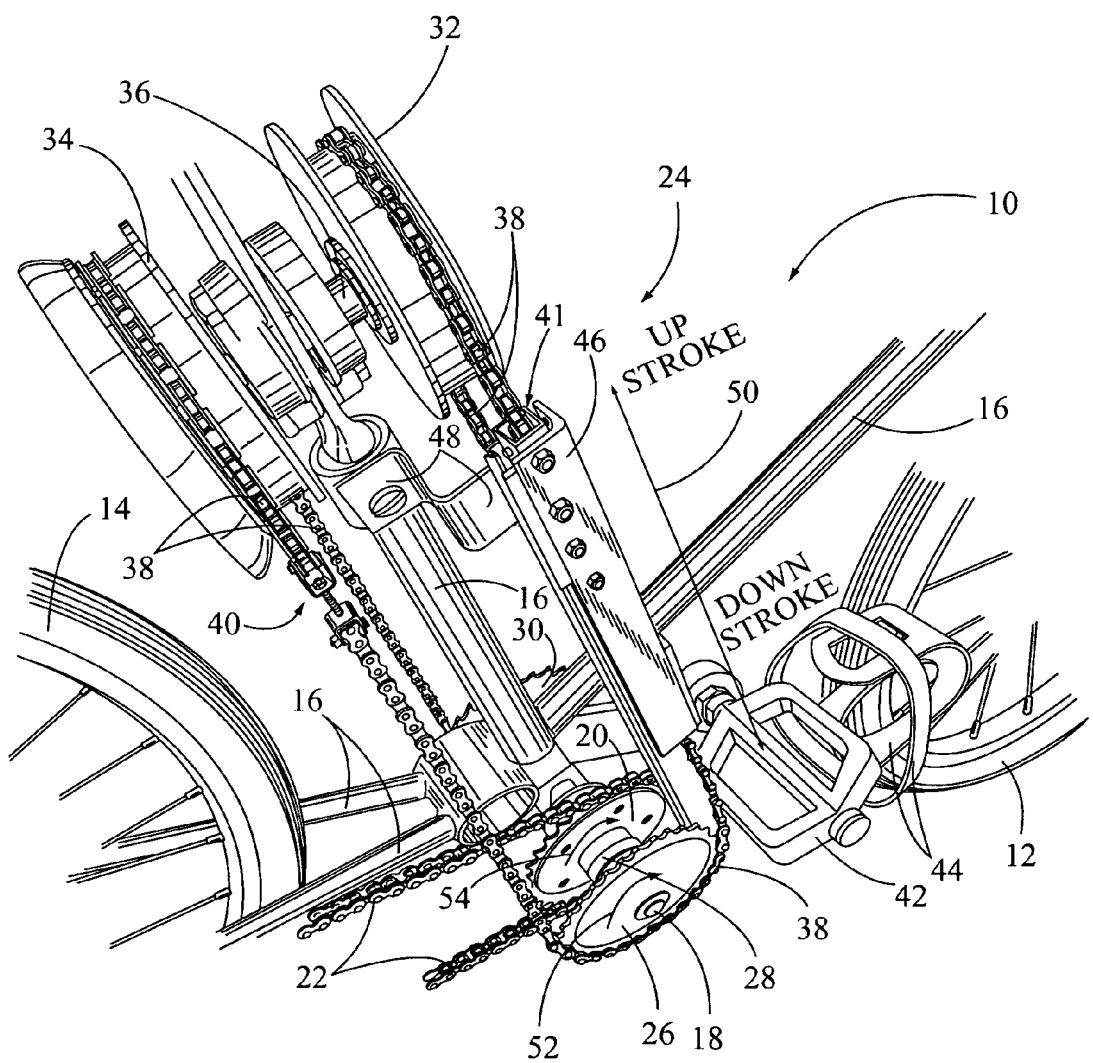
FIG. 1 is a perspective view of the linear to rotary drive system mounted on one side, or the right side, of a standard bicycle and illustrating a first pedal mounted on an endless, linear drive chain.
Figure 4:
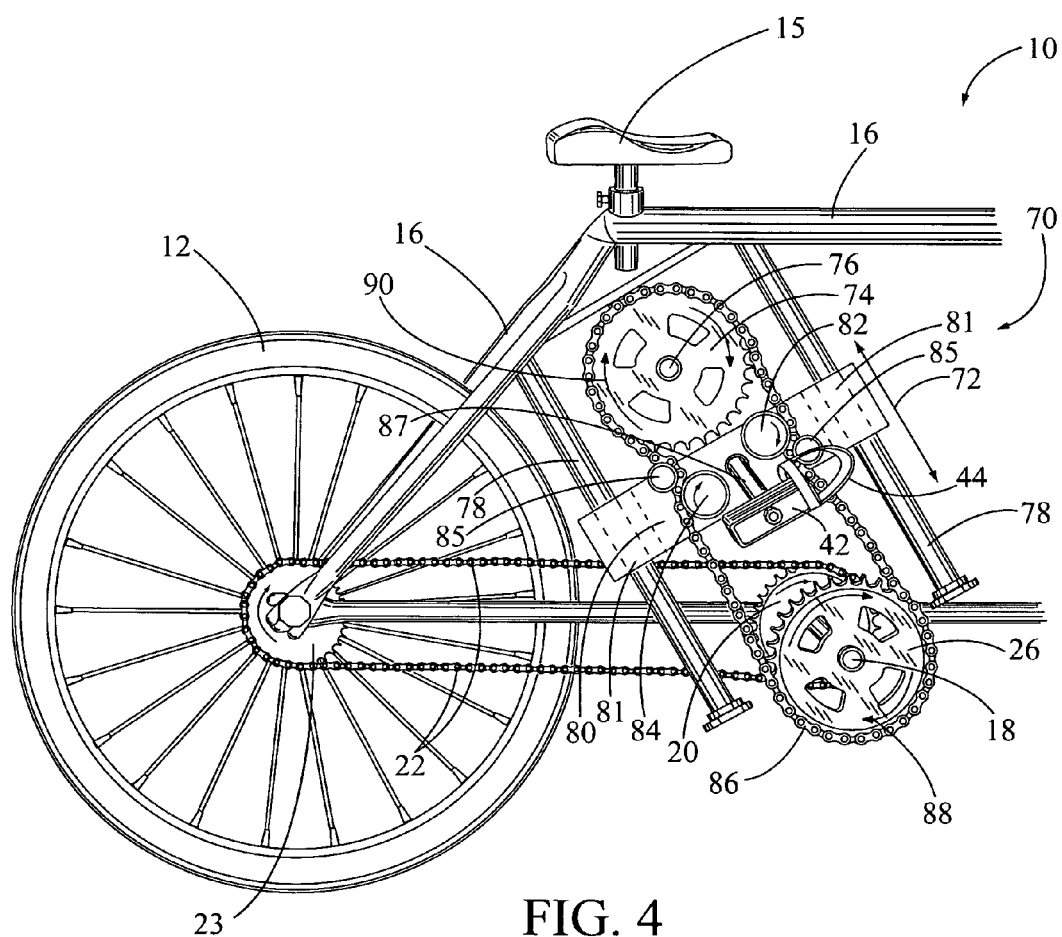
FIG. 4 is an alternate embodiment of the invention and illustrates a perspective view of the linear to rotary drive system mounted on one side of the standard bicycle and illustrating a one pedal operation of the bicycle.

In FIG. 1, a standard bicycle rotary drive system is shown mounted on a bicycle having general reference numeral 10. The bicycle 10 includes a front wheel 12 and rear wheel 14 mounted on a bike frame 16. A bicycle seat 15 is shown in FIG. 4. The bike's handlebars are not shown in the drawings. The frame 16 includes a rotary drive shaft 18 perpendicular to the length of the frame 16. A rotary drive sprocket 20 is attached to the rotary drive shaft 18. A horizontal, rotary, endless chain 22 is received on the rotary drive sprocket 20 and on a rear wheel driven sprocket 23 mounted on the rear wheel 14. The rear wheel driven sprocket 23 is shown in FIG. 4.

The linear drive system, for mounting on the bicycle 10 and incorporated into the rotary drive system for increased torque thereon, is shown having a general reference numeral 24. The linear drive system 24 includes a first linear drive sprocket 26 incorporating a one-way clutch 28 therein. The sprocket 26 is mounted on one end of the rotary drive shaft 18. A second linear drive sprocket 30 incorporates a one-way clutch 28 and is mounted on an opposite end of the rotary drive shaft 18 and shown in FIG. 3.

A first linear driven idler pulley 32 and a second linear driven idler pulley 34 are mounted on an upper pulley shaft 36. The upper pulley shaft 36 is adapted for mounting on the bike frame 16 and is disposed above the rotary drive shaft 18 and at right angles thereto.

A near vertical, endless linear drive chain 38 is mounted on the first and second linear drive sprockets 26 and 30 and the first and second linear driven idler pulleys 32 and 34. A right angle adjustable chain coupler, having general reference numeral 40, is attached to the linear drive chain 38 and disposed above and on one side of the first linear drive sprocket 26. The chain coupler 40 is shown in greater detail in FIG. 2. Also, a right angle fixed chain coupler, having general reference numeral 41, is attached to the linear drive chain 38 and disposed above and on an opposite side of the first linear drive sprocket 26.

Figure 3:
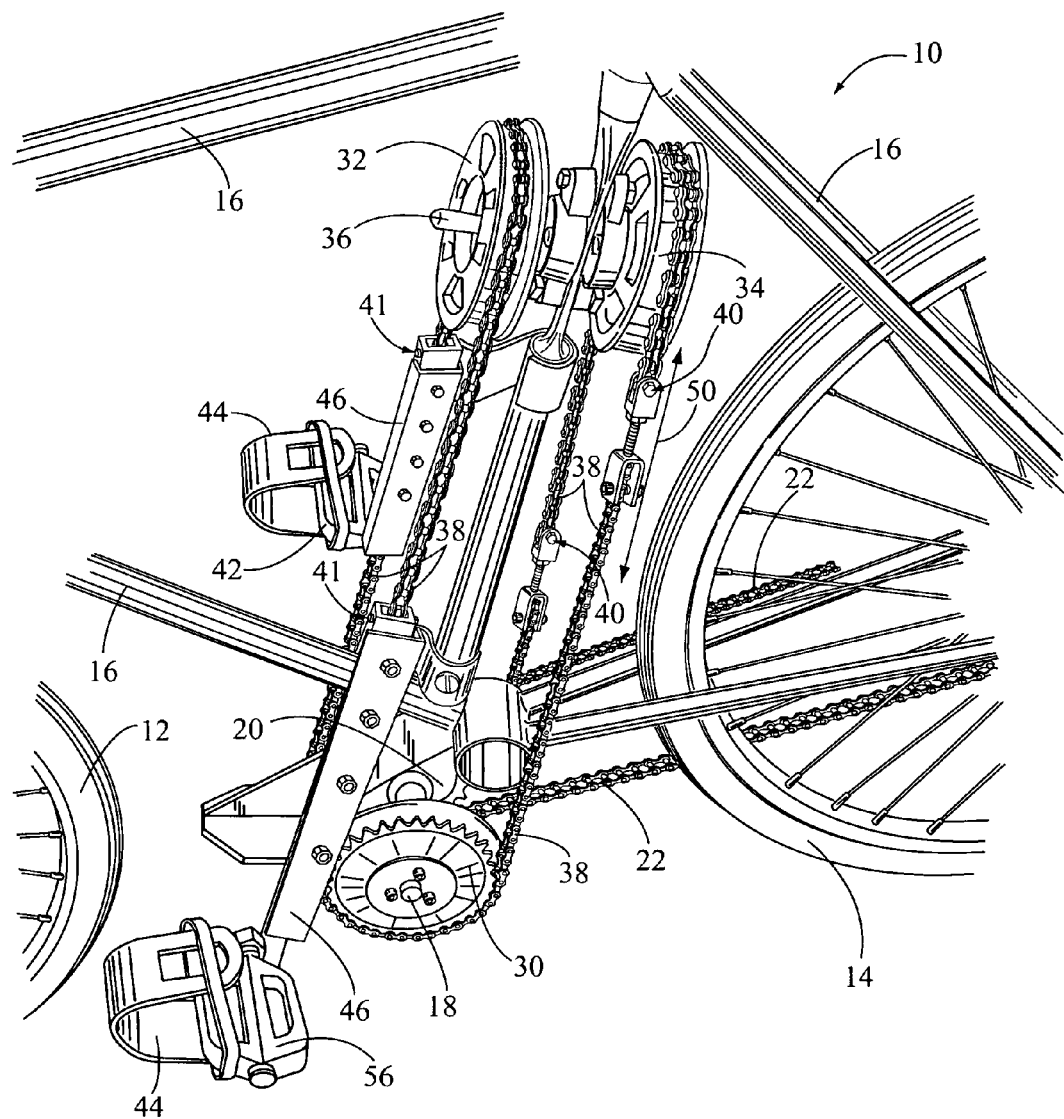
FIG. 3 is a perspective view of the linear to rotary drive system mounted on an opposite side, or the left side, of the standard bicycle and illustrating a second pedal mounted on the endless, linear drive chain.

A second right angle adjustable chain coupler 40 and a second right angle fixed chain coupler 41 are attached to the linear drive chain 38 and disposed above and on opposite sides of the second linear drive sprocket 30, as shown in FIG. 3.

In this drawing, a first pedal 42 with shoe strap 44 is attached to the linear drive chain 38 using a sliding chain guide 46. A portion of the fixed chain coupler 41 is shown expending upwardly from the chain guide 46. The sliding chain guide 46 is attached to and slides on a chain guide rail channel arm 48 attached to the bike frame 16 as the first pedal 42 moves linearly up and down, as indicated by arrow 50. It should be noted that while the first pedal 42 might be attached directed to the linear drive chain 38, the chain guide 46 helps prevent the twisting of the chain to prevent it from coming off either the linear chain drive sprockets 26 and 30 or the linear driven idler pulleys 32 and 34.

In the operation of the first pedal 42 by a bike rider, the rider's right foot moves the pedal in a down stroke with the linear drive chain 38 rotating the first linear drive sprocket 26 and the rotary drive shaft 18 in a clockwise direction, as indicated by arrow 52. At the same time, the rotary drive sprocket 20, attached to the rotary drive shaft 18, is also rotated in a clockwise direction, as indicated by arrow 54, thus rotating the rotary endless chain 22 and providing the necessary torque in driving the bicycle 10.

When the linear down stroke of the first pedal 42 is completed, a second pedal 56 on the opposite side of the frame 16, and shown in FIG. 3, moves downwardly in a down stroke for rotating the second linear drive sprocket 30 in a clockwise direction thus continuing the rotation of the rotary drive sprocket 20 in a clockwise direction. At this time, the first pedal 42 moves the first linear drive sprocket 26 in a counterclockwise direction and the one-way clutch 28 releases the sprocket 26 from it's attachment to the rotary drive shaft 18. This feature allows the first linear drive sprocket 26 to free wheel in a counterclockwise direction as the first pedal 42 returns to the top of the linear drive chain 38 and prior to another power, linear down stroke.

Figure 2:
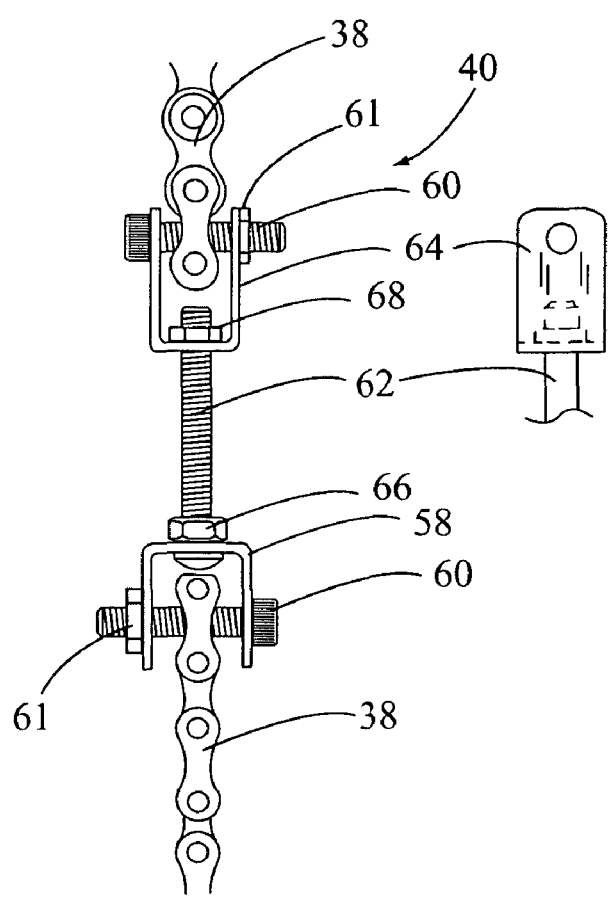
FIG. 2 and FIG. 2A illustrate a front view of a right angle adjustable chain coupler and a right angle fixed chain coupler. The two couplers are used for rotating the linear drive chain 90 degrees for the chain's receipt around and over the top of the first and second linear driven idler pulleys. The right angle adjustable chain coupler is also used for adjusting the length of the chain.

In FIG. 2, a front view of one of the right angle adjustable chain couplers 40 is shown. The coupler 40 is used for rotating the linear drive chain 90 degrees for the chain's receipt around and over the top of the second linear drive pulley 34. The coupler 40 includes a lower yoke 58 with a threaded bolt 60 with locking nut 61 used for attaching to a lower end of the chain 38. The lower yoke 58 is attached to a chain length adjustment bolt 62 with locking nut 66. The length adjustment bolt 62 is used for tightening and loosening the chain 38 on the linear drive sprockets and driven idler pulleys. An upper end of the bolt 62 is attached to an upper yoke 64 using a captured locking nut 68. The upper yoke 64 is attached to an upper end of the chain 38 using a threaded bolt 60 and locking nut 61. By rotating the upper yoke 90 degrees with the lower yoke, the upper end of the chain 38 is disposed 90 degrees from the lower end of the chain. In this manner, the rollers making up the chain 38 are free to engage and roll over the top of the second linear driven idler pulley 34.

Figure 2A:
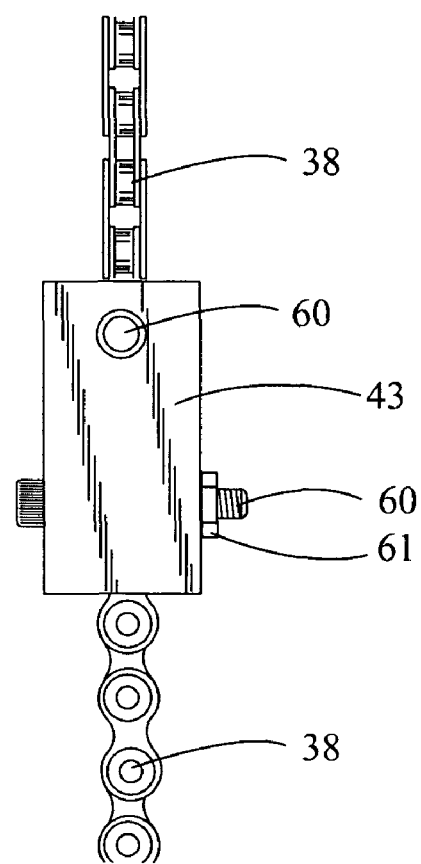

In FIG. 2A, the right angle fixed chain coupler 41 is shown. The coupler 41 has a hollow box-shaped housing 43 with an open lower end and an open upper end. The open lower end of the housing 43 is used for receiving an upper end of the chain 38 and attached to the sides of the housing the threaded bolt 60 and the locking nut 61. The open upper end of the housing 43 is used for receiving the lower end of the chain 38, which has been rotated 90 degrees and is attached to the housing the threaded bolt 60 and locking nut 61. In this manner, the rollers making up the chain 38 are free to engage and roll over the top of the first linear driven idler pulley 32.

In FIG. 3, a perspective view of the linear to rotary drive system 24 is shown on the other side of the bike frame 16 and illustrating the second pedal 56 with shoe strap 44 mounted on the endless, linear drive chain 38 using the sliding chain guide 46. The pedal 56 is disposed between the second linear drive sprocket 30 and the first linear driven idler pulley 32 and operates in a similar fashion on the linear drive chain 38 as the first pedal 42. It should be noted that either the first and second pedals with shoe straps can be used to operate the linear to rotary drive system 24 and using a single pedal.

In FIG. 4, an alternate embodiment of the invention is shown and illustrates a perspective view of a linear drive system used for a one pedal operation of the bicycle 10. The one pedal linear drive system is shown having a general reference numeral 70. This type of system can be used by a bike rider having an injured foot, having one leg or a similar handicap.

In this drive system 70, the first pedal 42 rotates the first linear drive sprocket 26 during both the down stroke and the up stroke, as indicated by arrow 72. This embodiment of the invention doesn't use the second linear drive sprocket 30 mounted on the rotary drive shaft 18 and doesn't use the first and second linear driven idler pulleys 32 and 34, shown in FIGS. 1 and 3.

The one pedal drive system 70 includes an upper linear driven idler pulley 74 mounted on an idler shaft 76. The idler shaft 76 is rotatably mounted on an upper portion of a double clutch housing frame 78. The frame 78 is attached to the bike frame 16. A double clutch housing 80 includes a pair of pillow block bearings 81 for sliding up and down on the housing frame 78.

The double clutch housing 80 includes a first one-way clutch 82 and a second one-way clutch 84 and two chain guides 85. An endless, linear drive chain 86 is mounted on the first and second one-way clutches 82 and 84 and on the first linear drive sprocket 26 and the upper linear driven idler pulley 74. The first pedal 42 is attached to the clutch housing 80 using a pedal shaft 87.

In operation, the right foot of the bike rider would be placed on the first pedal 42 and the foot would urge the pedal downward. At this time, the first one-way clutch 82 would engage the linear drive chain 86 and pull the chain downward. The chain 86 then rotates the first linear drive sprocket 26 and the upper linear driven idler pulley 74 in a clockwise direction, as indicated by arrows 88 and 90. The sprocket 26 in turn rotates the rotary drive sprocket 20 for applying torque thereon for driving the bicycle chain 22. Also at this time, the second one-way clutch 84 is disengaged from the drive chain 86 as the double clutch housing 80 moves downward.

At the bottom of the down stroke, the rider, using the shoe strap 44, moves the first pedal 42 upwardly in an upstroke. At this time, the second one-way clutch 84 engages the drive chain pulling it upward and continues to rotate the first linear drive sprocket 26 and the upper linear idler pulley 74 in a clockwise direction for rotating the rotary drive sprocket 20 and applying continuous torque on driving the bicycle 10 forward. During the upstroke, the first one-way clutch 82 is disengaged from the drive chain 86 as the double-clutch housing 80 moves upward.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A linear to rotary transfer drive system for increased torque on a standard bicycle, the transfer drive system comprising:
    a first linear drive sprocket with a one-way clutch and adapted for mounting on one end of a rotary drive shaft on a bike frame;
    a second linear drive sprocket with a one-way clutch and adapted for mounting on an opposite end of the rotary drive shaft;
    a first linear driven idler pulley and a second linear driven idler pulley mounted on an upper pulley shaft, the upper pulley shaft adapted for mounting on the bike frame and disposed above the rotary drive shaft and at a right angle thereto;
    an endless linear drive chain mounted on the first and second linear drive sprockets and the first and second linear driven idler pulleys;
    a first pedal attached to the linear drive chain and disposed on one side of the bike frame and between the first linear drive sprocket and the first linear driven idler pulley; and
    a second pedal attached to the linear drive chain and disposed on an opposite side of the bike frame between the second linear drive sprocket and the first linear driven idler pulley.

2. The transfer drive system as described in claim 1 further including a first pair of right angle chain couplers attached to the linear drive chain and disposed on one side and above the first linear drive sprocket and a second pair of right angle chain couplers attached to the linear drive chain and disposed on an opposite side and above the second linear drive sprocket.

3. The transfer drive system as described in claim 2 wherein the first pair of right angle chain couplers include a first right angle adjustable chain coupler for adjusting the length of the linear drive chain and a first right angle fixed chain coupler.

4. The transfer drive system as described in claim 3 wherein the second pair of right angle chain couplers include a second right angle adjustable chain coupler for adjusting the length of the linear drive chain and a second right angle fixed chain coupler.

5. The transfer drive system as described in claim 1 further including a first linear chain guide mounted on one side of the frame and disposed next to the linear drive chain for guiding a portion of the chain and the first pedal as it is moved linearly up and down on the bicycle.

6. The transfer drive system as described in claim 5 further including a second linear chain guide mounted an the opposite side of the frame and disposed next to the linear drive chain for guiding a portion of the chain and the second pedal as it is moved linearly up and down on the bicycle.

7. A linear to rotary transfer drive system for increased torque on a standard bicycle, the bicycle having a front wheel and a rear wheel mounted on a bike frame with seat, the frame having a rotary drive shaft attached to a rotary drive sprocket and a rotary, endless chain received on the rotary drive sprocket and on a rear wheel driven sprocket, the rear wheel driven sprocket mounted on the rear wheel, the transfer drive system comprising:

a first linear drive sprocket with a one-way clutch and adapted for mounting on one end of the rotary drive shaft, the rotary drive shaft disposed at a right angle to the bike frame;

a second linear drive sprocket with a one-way clutch and adapted for mounting on an opposite end of the rotary drive shaft;

a first linear driven idler pulley and a second linear driven idler pulley mounted on an upper pulley shaft, the upper pulley shaft adapted for mounting on an upper portion of the bike frame and disposed above the rotary drive shaft and at a right angle thereto;

an endless linear drive chain mounted on the first and second linear drive sprockets and the first and second linear driven idler pulleys;

a first pedal attached to the linear drive chain and disposed on one side of the frame and between the first linear drive sprocket and the first linear driven idler pulley; and a second pedal attached to the linear drive chain and disposed on an opposite side of the frame between the second linear drive sprocket and the first linear driven idler pulley.

8. The transfer drive system as described in claim 7 further including a first pair of right angle chain couplers attached to the linear drive chain and disposed on one side and above the first linear drive sprocket and a second pair of right angle chain couplers attached to the linear drive chain and disposed on an opposite side and above the second linear drive sprocket.

9. The transfer drive system as described in claim 8 wherein the first pair of right angle chain couplers include a first right angle adjustable chain coupler disposed above and on one side of the first linear drive sprocket, the adjustable chain coupler for adjusting the length of the linear drive chain and a first right angle fixed chain coupler disposed above and on an opposite side of the first linear drive sprocket.

10. The transfer drive system as described in claim 9 wherein the second pair of right angle chain couplers include a second right angle adjustable chain coupler disposed above and on one side of the second linear drive sprocket, the adjustable chain coupler for adjusting the length of the linear drive chain and a second right angle fixed chain coupler disposed above and on an opposite side of the second linear drive sprocket.

11. The transfer drive system as described in claim 7 further including a first linear chain guide mounted on one side of the frame and disposed next to the linear drive chain for guiding a portion of the chain and the first pedal as it is moved linearly up and down on the bicycle.

12. The transfer drive system as described in claim 11 further including a second linear chain guide mounted an the opposite side of the frame and disposed next to the linear drive chain for guiding a portion of the chain and the second pedal as it is moved linearly up and down on the bicycle.

13. A one pedal linear to rotary transfer drive system for increased torque on a standard bicycle, the bicycle having a front wheel and a rear wheel mounted on a bike frame with seat, the frame having a rotary drive shaft attached to a rotary drive sprocket and a rotary, endless chain received on the rotary drive sprocket and on a rear wheel driven sprocket, the rear wheel driven sprocket mounted on the rear wheel, the transfer drive system comprising:

a linear drive sprocket adapted for mounting on one end of the rotary drive shaft, the rotary drive shaft disposed at a right angle to the bike frame;

an upper linear driven idler pulley mounted on a double clutch housing frame, the clutch housing frame adapted for mounting on the bike frame;

a double clutch housing having a first one-way clutch and a second one-way clutch mounted thereon;

an endless linear drive chain mounted on the linear drive sprocket and mounted on the upper linear driven idler pulley and engaging the first and second one-way clutches on the double clutch housing; and a pedal attached to the double clutch housing, the pedal moving the double clutch housing linearly along the drive chain for rotating the linear drive sprocket during a down stroke of the pedal and for rotating the linear drive sprocket during an up stroke of the pedal.

14. The transfer drive system as described in claim 13 further including a shoe strap attached to the pedal and used to lift the pedal during the up stroke of the linear to rotary drive system.

* * * * *